(12) United States Patent
Ikegami et al.

(10) Patent No.: US 10,365,519 B2
(45) Date of Patent: Jul. 30, 2019

(54) LIQUID CRYSTAL DISPLAY DEVICE

(71) Applicant: Mitsubishi Electric Corporation, Tokyo (JP)

(72) Inventors: Eri Ikegami, Tokyo (JP); Yasunori Niwano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/801,850

(22) Filed: Nov. 2, 2017

(65) Prior Publication Data

US 2018/0136524 A1    May 17, 2018

(30) Foreign Application Priority Data

Nov. 15, 2016  (JP) .................................. 2016-222038

(51) Int. Cl.

| G02F 1/1343 | (2006.01) |
| G02F 1/1368 | (2006.01) |
| G02F 1/1335 | (2006.01) |
| G02F 1/1333 | (2006.01) |

(52) U.S. Cl.
CPC ...... *G02F 1/134363* (2013.01); *G02F 1/1368* (2013.01); *G02F 1/133308* (2013.01); *G02F 1/133502* (2013.01); *G02F 1/133512* (2013.01); *G02F 1/133514* (2013.01); *G02F 2001/133331* (2013.01); *G02F 2001/133334* (2013.01); *G02F 2201/503* (2013.01); *G02F 2202/22* (2013.01); *G02F 2202/28* (2013.01); *G02F 2203/05* (2013.01)

(58) Field of Classification Search
None
See application file for complete search history.

(56) References Cited

U.S. PATENT DOCUMENTS 6,191,837 B1 *  2/2001  Fujimaki ........... G02F 1/134363
                                                349/141
9,207,475 B2   12/2015  Kiyohara et al.

FOREIGN PATENT DOCUMENTS

| JP | H10-293207 A  | 11/1998 |
| JP | 2009-250989 A | 10/2009 |
| JP | 2012-093667 A | 5/2012  |
| JP | 2012-155258 A | 8/2012  |
| JP | 2013-029601 A | 2/2013  |

* cited by examiner

*Primary Examiner* — James A Dudek
(74) *Attorney, Agent, or Firm* — Studebaker & Brackett PC (57) ABSTRACT

A liquid crystal display device includes a liquid crystal panel, a transparent protective member, and a transparent adhesive material. The liquid crystal panel is an in-plane switching liquid crystal panel including a TFT substrate, a counter substrate sandwiching a liquid crystal layer between the counter substrate and the TFT substrate, and a transparent conductive film being provided on a surface opposite to the liquid crystal layer of the counter substrate, a side of the transparent conductive film being a side of a display surface. The transparent protective member covers a surface on the side of the display surface of the liquid crystal panel. The transparent adhesive material attaches the transparent protective member on the surface on the side of the display surface. The transparent conductive film has a film thickness ranging from 120 nm to 160 nm.

9 Claims, 5 Drawing Sheets

LIQUID CRYSTAL DISPLAY DEVICE

BACKGROUND OF THE INVENTION

Field of the Invention

The present invention relates to a liquid crystal display device, and particularly to a liquid crystal display device in which a transparent protective member is attached on a front surface of an in-plane switching liquid crystal panel with a transparent adhesive material.

Description of the Background Art

In a liquid crystal display device including an in-plane switching liquid crystal panel in which a voltage is applied in parallel with a substrate surface, an electrode is provided in a substrate in which a drive element such as a thin film transistor (TFT) is formed (also referred to as "the TFT substrate" or "the array substrate"), but is not provided in a counter substrate in which a color filter, for example, is provided (also referred to as "the color filter (CF) substrate). Thus, an external electrical field such as a static electricity entering from a side of the counter electrode or a charge-up on a surface of the counter electrode may cause a defect in a display on the liquid crystal panel.

Accordingly, adopted in the liquid crystal display device including a conventional general in-plane switching liquid crystal panel, as a measure against an electrostatic discharge (ESD) described above, is a structure that an indium thin oxide (ITO) film having a film thickness of approximately 25 nm is formed on a glass surface located on a side of a display surface of the counter substrate (that is to say, a side opposite to the TFT substrate) so as to suppress the external electrical field entering from the side of the counter substrate. The above ITO film can be functionally referred to as "the transparent conductive film", or also referred to as "the back surface ITO" because it is provided on a back side with respect to a surface on which the color filter is disposed.

In the meanwhile, in a case where the back surface ITO is provided, a difference of refraction index between the back surface ITO, a polarization plate disposed on an upper surface of the back surface ITO, and the glass on the counter substrate located below the back surface ITO causes an interface reflection and increases a reflection ratio of the liquid crystal panel, thereby causing a problem. Considered as a main factor of the increase in the reflection ratio in the above configuration is a reflection at an interface between the polarization plate and the back surface ITO and a reflection at an interface between the back surface ITO and the glass on the counter substrate. These reflection elements largely double the reflection ratio of the liquid crystal panel compared with a liquid crystal display device which does not include the back surface ITO.

As a method of improving the reflection ratio, for example, Japanese Patent Application Laid-Open No. 2009-250989 describes a method of placing a low refraction index film on an upper layer or a lower layer of the back surface ITO for purpose of reducing the reflection at the interface between the polarization plate and the back surface ITO or the reflection at the interface between the back surface ITO and the glass as described above, thereby causing the film thickness of the back surface ITO to be relatively thin, that is approximately 10 nm to 20 nm.

In the meanwhile, as a method of enhancing the effect against the ESD, Japanese Patent Application Laid-Open No. 2012-155258 describes a method applying a resin layer into which conductive inorganic particles are mixed to form a transparent conductive film having a thickness of approximately 0.2 μm to 5 μm, and using the transparent conductive film as the back surface ITO. Japanese Patent Application Laid-Open No. 10-293207 describes an example of using an ITO film, which is formed to be relatively thick, that is 145 nm or 180 nm, for example, by sputtering, as the back surface ITO.

Recently, a liquid crystal display device to be placed outside, for example, includes a transparent protective plate (also referred to as "a transparent protective member" or "a cover glass") made of resin or glass, for example, on a side of a front surface (that is to say, a display surface) of the liquid crystal panel to protect the liquid crystal panel against an external impact, for example. If there is an air layer between the liquid crystal panel and the protective plate in the above case, an external light entering from the side of the front surface of the liquid crystal panel is reflected by front and back surface of the protective plate and the front surface of the liquid crystal panel, thus a problem that a visibility in the display of the liquid crystal panel reduces occurs.

Accordingly, applied is a configuration of filling a transparent resin between the liquid crystal panel and the protective plate or a configuration of attaching the liquid crystal panel and the protective plate with a transparent adhesive material such as a light transmissive adhesive sheet made of resin therebetween, for example. The configuration similar to the above description is applied to the liquid crystal display device including a touch panel on the front surface of the liquid crystal panel to prevent the air layer from being formed between the touch panel and the liquid crystal panel. As described above, the liquid crystal display device including the protective plate or the touch panel on the side of the front surface of the liquid crystal panel (collectively referred to as "the front surface panel" hereinafter) has the configuration of placing the resin layer (the injected resin or the light-transmissive adhesive sheet) between the liquid crystal panel and the front surface panel to suppress the formation of the air layer.

As described above, the liquid crystal display device including the front surface panel originally has the problem of the reflection caused by the formation of the air layer between the front surface panel and the liquid crystal panel as described previously, so that the measure described above has been taken. However, the configuration of including the front surface panel has also been started to be applied to the liquid crystal display device including the in-plane switching liquid crystal panel including the back surface ITO described previously, so that the increase in the reflection ratio occurring compositely in the front surface panel, the resin layer, and the back surface ITO also becomes one of the additional problems.

SUMMARY

Problem to be Solved by the Invention

However, in a case of applying the method of adding the low refraction index film on the upper layer or the lower layer of the back surface ITO, thereby causing the back surface ITO to be relatively thin, that is approximately 10 nm to 20 nm as described in Japanese Patent Application Laid-Open No. 2009-250989, a process of forming the low refraction index film and a material of the low refraction index film are necessary to add the low refraction index film, thereby causing a cost increase as a matter of course. Furthermore, the thinned back surface ITO has a high resistance, so that the effect against the ESD, which is the intended purpose for forming the back surface ITO, is reduced.

Japanese Patent Application Laid-Open Nos. 2012-155258 and 10-293207 in the above description describe the method of enhancing the effect against the ESD, but do not describe the method of improving the reflection ratio. Particularly, with regard to the problem of the reflection ratio in the liquid crystal display device including the front surface panel on the side of the display surface of the in-plane switching liquid crystal panel described above, Japanese Patent Application Laid-Open Nos. 2012-155258 and 10-293207 have no description of the configuration of including the front surface panel, thus do not disclose the effective method of improving the reflection ratio in the structure that the front surface panel is disposed on the side of the display surface.

Provided is a liquid crystal display device capable of suppressing an external electrical field entering from a side of a counter substrate and suppressing a reflection of an external light entering from a side of a display surface at the same time.

Means to Solve the Problem

A liquid crystal display device according to the present invention includes a liquid crystal panel, a transparent protective member, and a transparent adhesive material. The liquid crystal panel is an in-plane switching liquid crystal panel including a TFT substrate, a counter substrate sandwiching a liquid crystal layer between the counter substrate and the TFT substrate, and a transparent conductive film being provided on a surface opposite to the liquid crystal layer of the counter substrate, a side of the transparent conductive film being a side of a display surface. The transparent protective member covers a surface on the side of the display surface of the liquid crystal panel. The transparent adhesive material attaches the transparent protective member on the surface on the side of the display surface. The transparent conductive film has a film thickness ranging from 120 nm to 160 nm.

Effects of the Invention

According to the present invention, the transparent conductive film has the film thickness ranging from 120 nm to 160 nm, thus the liquid crystal display device, in which the transparent protective member is attached on the in-plane switching liquid crystal panel with the transparent adhesive member, can suppress an external electrical field entering from a side of the counter substrate and suppress the reflection of an external light entering from a side of the display surface at the same time.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are described based on the drawings hereinafter.

Embodiment 1

<Configuration of Liquid Crystal Display Device>

Figure 1:
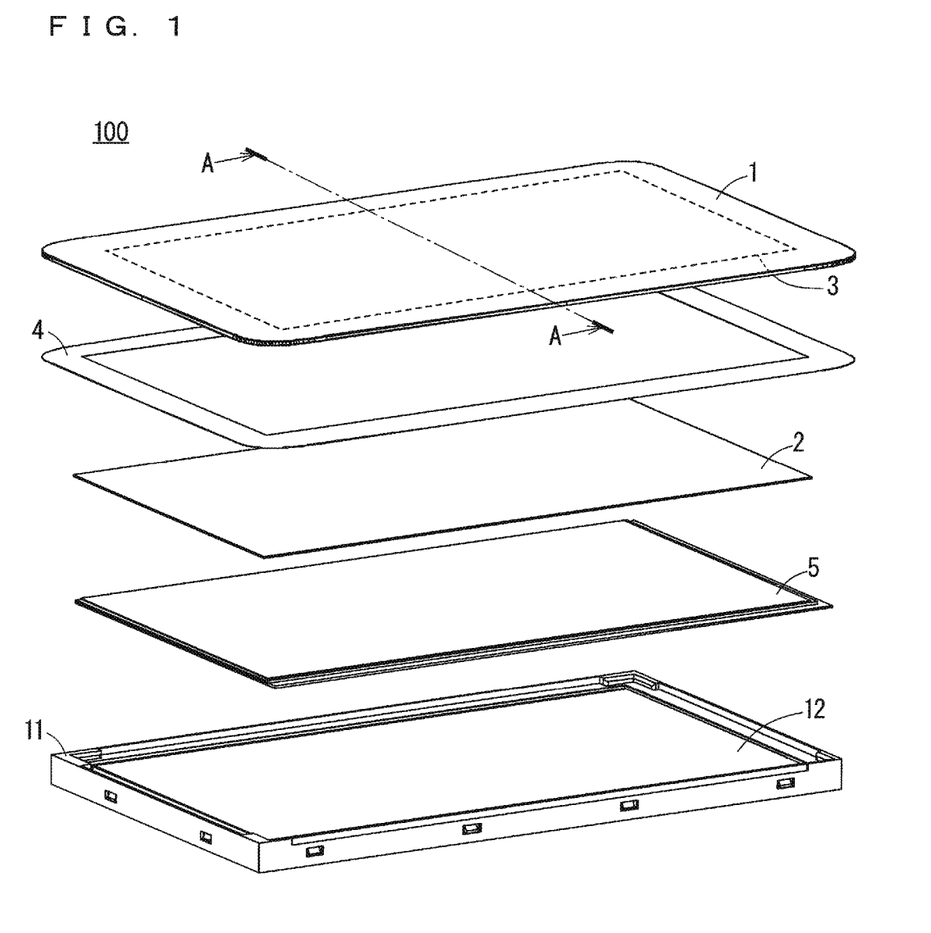
FIG. 1 is an exploded perspective view of a liquid crystal display device according to an embodiment 1.
Figure 2:
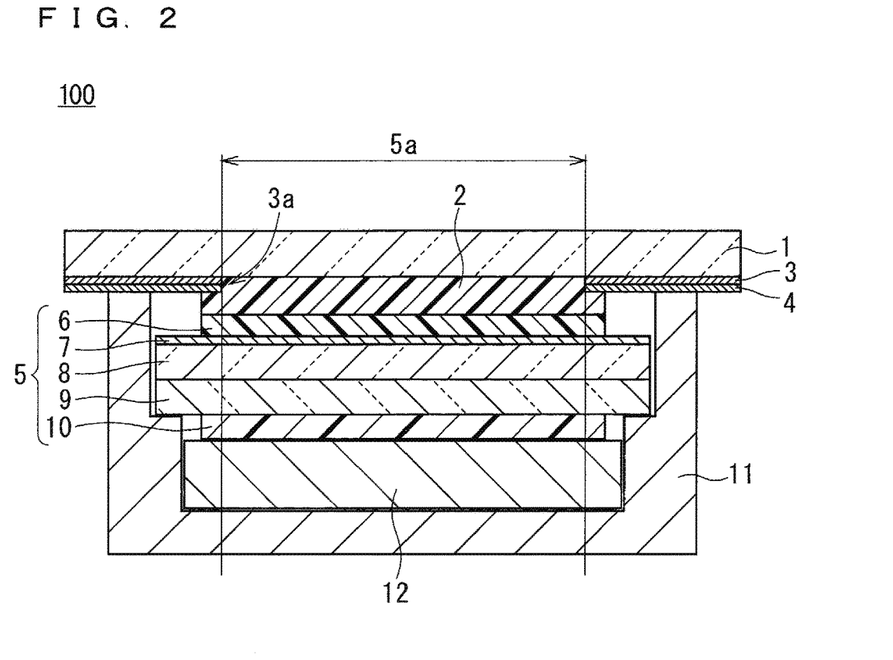
FIG. 2 is a cross sectional view of the liquid crystal display device according to the embodiment 1.

FIG. 1 is an exploded perspective view schematically illustrating an example of a configuration of a liquid crystal display device 100 according to the embodiment 1 of the present invention. FIG. 2 is a cross sectional view taken along an arrow A-A illustrated in FIG. 1.

As illustrated in FIGS. 1 and 2, the liquid crystal display device 100 includes a transparent protective member 1, a transparent adhesive material 2, a light-shielding film 3, an adhesive material 4, a liquid crystal panel 5, a housing 11, and a backlight unit 12.

The liquid crystal panel 5 is an in-plane switching liquid crystal panel and includes, as illustrated in FIG. 2, polarization plates 6 and 10, a transparent conductive film 7, a counter substrate 8, and a TFT substrate 9. In the liquid crystal panel 5, two glass substrates, that is to say, the TFT substrate 9 being a first substrate and the counter substrate 8 being a second substrate are disposed to face each other, and these two substrates sandwich a liquid crystal layer (not shown) therebetween. The polarization plate 10 is attached on an outer surface (that is to say, a surface opposite to the liquid crystal layer) of the TFT substrate 9. The polarization plate 6 is attached on a surface of the transparent conductive film 7, which will be described hereinafter, opposite to the counter electrode 8.

A circuit portion of a pixel including the TFT is formed on a surface of the TFT substrate 9 on which the liquid crystal layer is disposed. In the meanwhile, a color filter and a light-shielding film (a black matrix: BM), for example, are formed on a surface of the counter substrate 8 closer to a side where the liquid crystal layer is disposed. The transparent conductive film 7 for suppressing an entry of an external electrical field, for example, is formed on an outer surface of the counter substrate 8 (that is to say, between the polarization plate 6 and the counter substrate 8). The transparent conductive film 7 needs to be formed in at least a region covering a display region 5a in which a video is displayed on the liquid crystal panel 5 (also referred to as "the display area"), but is disposed to cover the entire outer surface of the counter substrate 8 in the present embodiment. Although not shown in the drawings, the transparent conductive film 7 is grounded and connected via a conductive paste or a conductive tape provided on a frame region outside the display region 5a in the liquid crystal panel 5.

In the present embodiment, the transparent conductive film 7 is a sputtering film (specifically, an ITO film) formed by sputtering with a predetermined film thickness ranging from 120 nm to 160 nm. Herein, the transparent conductive film 7 having an average thickness of 140 nm and variation range of ±10% is formed as an example. A film deposition temperature (a substrate temperature) at the time of sputtering is appropriately adjusted to adjust a film quality (or a resistivity) so that a sheet resistance in the transparent conductive film 7 having the predetermined film thickness ranges from 10Ω/☐ to 25Ω/☐.

The liquid crystal panel 5 is housed in a housing 11 together with the backlight unit 12. The transparent protective member 1 is attached on a display surface on which the video is displayed on the liquid crystal panel 5 (that is to say, the surface of the polarization plate 6 opposite to the counter substrate 8) via the transparent adhesive material 2 to cover the display surface. It is also applicable to place an index matching layer (a lamination film of a low refraction index layer and a high refraction index layer) between the transparent adhesive material 2 and the polarization plate 6 to attach the transparent adhesive material 2 on the polarization plate 6 via the index matching layer. An AR treatment (an antireflection treatment) may be appropriately performed on an outer surface of the transparent protective member 1 (that is to say, a surface of the transparent protective member 1 opposite to the transparent adhesive material 2). The transparent protective member 1 may be replaced with a touch panel, for example.

The transparent protective member 1 is attached on the surface of the liquid crystal panel 5 with the transparent adhesive material 2, and also is attached on and fixed to the housing 11 with the adhesive material 4 disposed on a periphery of a surface of the transparent protective member 1 closer to the liquid crystal panel 5. When the size of transparent adhesive material 2 is changed to be substantially the same as that of the transparent protective member 1, the transparent protective member 1 can be fixed to both the surface of the liquid crystal panel 5 and the housing 11 only with the transparent adhesive material 2, and the adhesive material 4 may be omitted in the above case.

The transparent adhesive material 2 suppresses the formation of an air layer in an area where the transparent adhesive material 2 is applied, thus can be appropriately selected from a resin layer such as an injection resin or a light-transmissive adhesive sheet. A combination of the material is selected so that the transparent adhesive material 2 has substantially the same refraction index as the transparent protective member 1 or a difference of the refraction index between the transparent adhesive material 2 and the transparent protective member 1 is at least equal to or smaller than 30% of the larger refraction index.

As illustrated in FIGS. 1 and 2, the light-shielding film 3, having a shape along the periphery of the surface of the transparent protective member 1 closer to the side where the liquid crystal panel 5 is disposed, is formed on the periphery. The light-shielding film 3 is formed to have a frame shape with an opening portion 3a, and a size of the opening portion 3a is the same or slightly smaller than that of the polarization plate 6 in a planar view, and is substantially the same as that of the display region 5a in the liquid crystal panel 5. The light-shielding film 3 prevents light emitted from the backlight unit 12 from being visually recognized from the outside of the display region 5a in the liquid crystal display panel 5 or prevents light leaked from the periphery of the counter substrate 8 from being visually recognized from the side of the display surface. The light-shielding film 3 is a film forme by printing a black ink, for example, thus is also referred to as "a black-framed printing", for example, in some cases.

<Operation and Effect>

Subsequently, an operation and an effect obtained in a structure of the liquid crystal display device 100 according to the present embodiment 1 are described in detail hereinafter.

Figure 3:
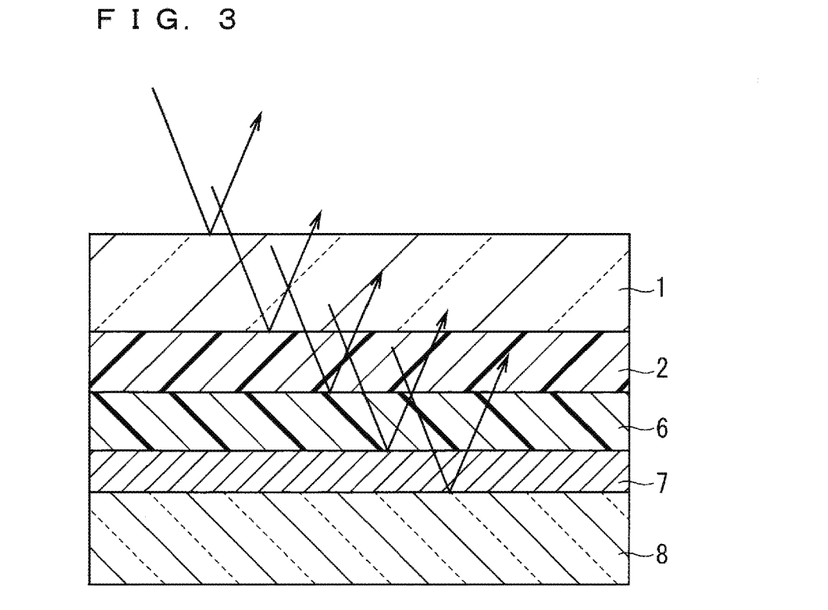
FIG. 3 is a drawing for describing a reflection in the liquid crystal display device according to the embodiment 1.

FIG. 3 is a drawing for describing a reflection in the liquid crystal display device 100. FIG. 3 illustrates an enlarged lamination structure of the transparent protective member 1 to the counter substrate 8 in the liquid crystal display device 100. As indicated by arrows in FIG. 3, the reflection in the liquid crystal display device 100 occurs due to an interference of a surface reflection and an interface reflection on each of the layers of the transparent protective member 1 to the counter substrate 8. In the example in FIG. 3, the reflection in the liquid crystal display device 100 occurs due to the interference of the reflection on each of the surface of the transparent protective member 1 (that is to say, the surface on the side of the display surface of the liquid crystal display device 100), the interface between the transparent protective member 1 and the transparent adhesive material 2, the interface between the transparent adhesive material 2 and the polarization plate 6, the interface between the polarization plate 6 and the transparent conductive film 7, and the interface between the transparent conductive film 7 and the counter substrate 8.

"The reflection in the liquid crystal display device 100" in the present description indicates, as described above, the reflection occurring due to the interference of the reflection light, which is the external light entering from the side of the display surface of the liquid crystal display device 100 and then reflected by the surface of the transparent protective member 1, with the interface reflection of the light entering inside the liquid crystal display device 100 from the opening portion 3a in the light-shielding film 3 and then reflected by each interface between the layers described above.

In the present embodiment, the AR treatment is performed on the surface of the transparent protective member 1 to reduce the reflection on the surface thereof. When the AR treatment is performed, the transparent protective member 1 becomes the transparent protective member 1 including a thin film layer having an antireflection function on the surface thereof. Since the transparent adhesive material 2 has substantially the same refraction index as the transparent protective member 1, the reflection on the interface between the transparent protective member 1 and the transparent adhesive material 2 is reduced. The reflection on the interface between the transparent adhesive material 2 and the polarization plate 6 can be reduced by sandwiching the index matching layer therebetween. As the other reflection element, the reflection due to the interference of the surface reflection on the transparent conductive film 7 with the reflection on the interface between the transparent conductive film 7 and the counter substrate 8 significantly contributes to the reflection ratio of the liquid crystal display device 100.

Figure 4:
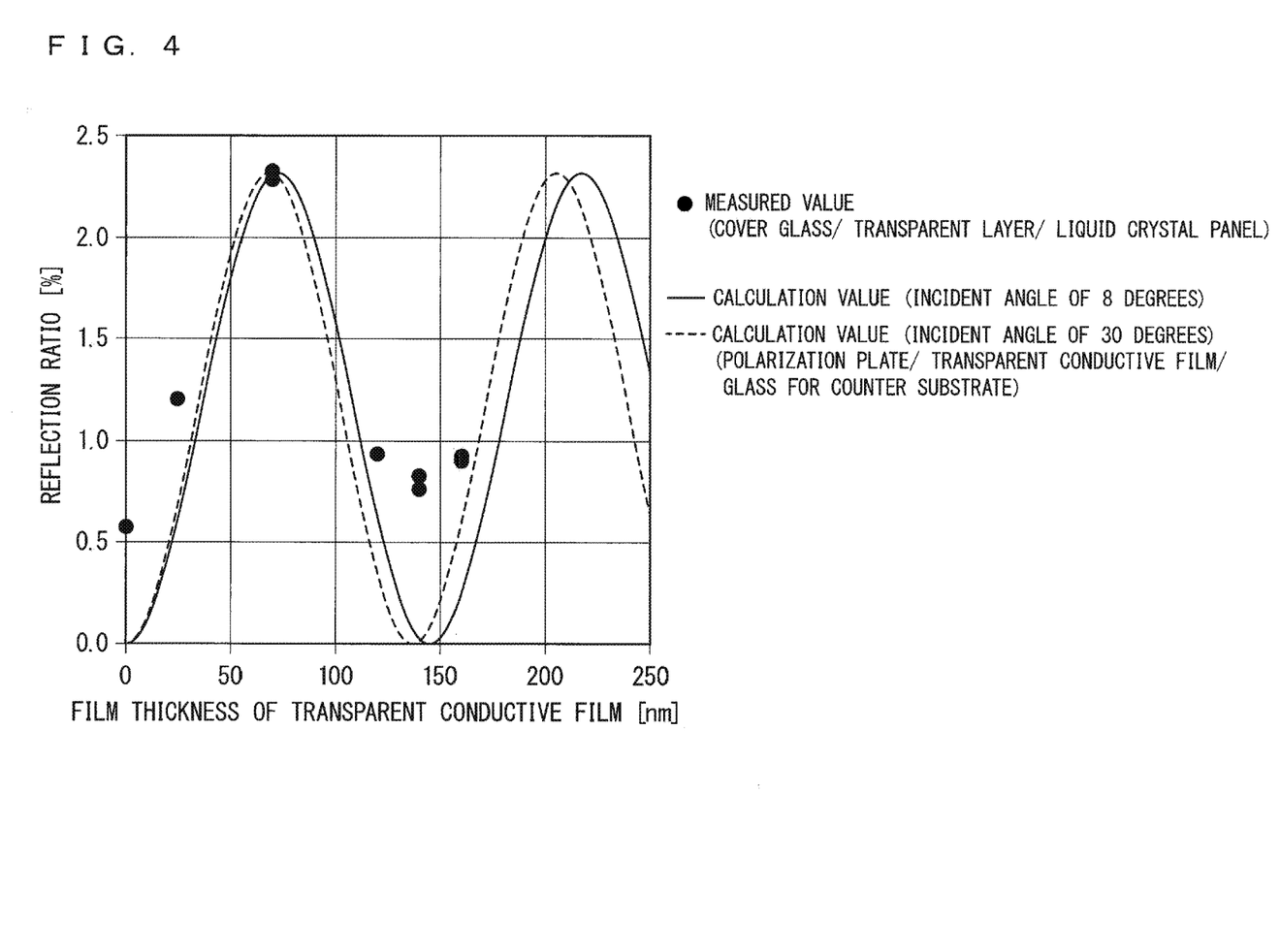
FIG. 4 is a drawing illustrating a film thickness dependency of a transparent conductive film with respect to a reflection ratio in the liquid crystal display device.

FIG. 4 is a drawing illustrating a film thickness dependency of a transparent conductive film with respect to a reflection ratio in the liquid crystal display device. Described hereinafter using FIG. 4 is an influence of the film thickness of the transparent conductive film 7 on the reflection due to the interference of the surface reflection on the transparent conductive film 7 significantly contributing to the reflection ratio of the liquid crystal display device 100 with the reflection on the interface between the transparent conductive film 7 and the counter substrate 8 (referred to as "the first reflection component" hereinafter) and the reflection including the other reflection as well as the reflection described above in a structure having the ansparent protective member 1 and the transparent adhesive material 2 (referred to as "the second reflection component" hereinafter).

Each of graphs indicated by a solid line and a dotted line in FIG. 4 indicates the film thickness dependency of the transparent conductive film with respect to the reflection ratio occurring due to the interference of the reflection on the surface and the interface between each layer calculated using a model, in which the lamination structure of laminating the glass substrate used for the counter substrate, the transparent conductive film, and the polarization plate in this order is simplified, at incident angles of 8 degrees and 30 degrees as a typical example. Data indicated by these graphs (also simply referred to as "the calculation value" hereinafter) is used for referencing the first reflection component (the reflection due to the interference of the surface reflection on the transparent conductive film 7 with the reflection on the interface between the transparent conductive film 7 and the counter substrate 8).

Furthermore, data plotted by black circles in FIG. 4 indicates the film thickness dependency of the transparent conductive film with respect to the overall reflection ratio measured using an experimental sample in which a transparent layer corresponding to the transparent adhesive material 2 (specifically, an oil layer having a refraction index of 1.5 for simplifying the experiment) and a cover glass corresponding to the transparent protective member 1 are disposed in this order on a side of a display surface of an in-plane switching liquid crystal panel. This data (also simply referred to as "the measured value" hereinafter) is used for referencing the second reflection component (the reflection including the reflection as well as the first reflection component in the structure having the transparent protective member 1 and the transparent adhesive material 2).

Firstly, the graphs of the calculation value in FIG. 4 show that the reflection ratio can be significantly reduced when the transparent conductive film has the film thickness ranging from 0 nm to 25 nm and from 120 nm to 160 nm. However, the range from 0 nm to 25 nm is not preferable regarding the effect against the ESD, and it is shown that the reflection ratio can be significantly reduced as long as the transparent conductive film 7 has a predetermined film thickness ranging from 120 nm to 160 nm or the average thickness of 140 nm and variation range of ±10%, as the example of the predetermined film thickness, adopted in the embodiment 1. This result corresponds to a case where the liquid crystal display device 100 particularly has a configuration, that is, the AR treatment is performed on the surface of the transparent protective member 1, the transparent adhesive material 2 and the transparent protective member 1 have substantially the same refraction index, and the index matching layer is disposed on the interface between the transparent adhesive material 2 and the polarization plate 6, thus the reflection due to the interference of the surface reflection on the transparent conductive film 7 with the reflection on the interface between the transparent conductive film 7 and the counter substrate 8 mainly has the influence on the reflection ratio of the liquid crystal display device 100.

In the meanwhile, the data of the measured value in FIG. 4 shows that the film thickness dependency of the transparent conductive film, particularly an absolute value of the reflection ratio in a thickness region where the reflection ratio is reduced slightly increases due to the influence of the reflection except the first reflection component (particularly, the reflection influenced by the cover glass and the transparent layer). This result corresponds to a case of omitting the following configuration from the liquid crystal display device 100, that is, the AR treatment is performed on the surface of the transparent protective member 1, the transparent adhesive material 2 and the transparent protective member 1 have substantially the same refraction index, and the index matching layer is disposed on the interface between the transparent adhesive material 2 and the polarization plate 6, for example. However, the data of the measured value indicates the same tendency as the graph of the calculation value, thus shows that the reflection ratio can be significantly reduced when the transparent conductive film has the film thickness ranging from 0 nm to 25 nm and from 120 nm to 160 nm. Accordingly, it is also shown that the reflection ratio can be significantly reduced as long as the transparent conductive film 7 has a predetermined film thickness ranging from 120 nm to 160 nm or the average thickness of 140 nm and variation range of ±10%, as the example of the predetermined film thickness, adopted to the liquid crystal display device 100 according to the embodiment 1. Moreover, it is shown that since the transparent conductive film 7 has relatively the large thickness ranging from 120 nm to 160 nm, the effect against the ESD (the effect of suppressing the entry of the external electrical field and the charge-up) can also be effectively obtained.

With regard to the degree of the reduction in the reflection ratio, the reflection ratio can be reduced by approximately 35% to 120% compared with the case where the transparent conductive film has the conventional general film thickness ranging from 25 nm to 70 nm.

As described above, in the liquid crystal display device 100 including the transparent protective member 1 attached on the in-plane switching liquid crystal panel 5 via the transparent adhesive member 2 according to the embodiment 1, the film thickness of the transparent conductive film 7 formed on the counter substrate 8 is set within the range from 120 nm to 160 nm, thus the function of suppressing the reflection of the external light entering from the side of the display surface and suppressing the external electrical field entering from the side of the counter substrate can be achieved at the same time.

Moreover, in the liquid crystal display device 100 according to the embodiment 1, the transparent conductive film 7 is the sputtering film formed by sputtering. The transparent conductive film 7 is therefore made up of the transparent conductive film material having relatively the low resistivity compared with a case where the transparent conductive film is formed of a coating-type transparent conductive film material, and further has the relatively large thickness ranging from 120 nm to 160 nm. Accordingly, the sheet resistance in the transparent conductive film 7 is set within the range from 10Ω/□ to 25Ω/□. As a result, the resistance value of the transparent conductive film 7 is set lower than the general sheet resistance of 30Ω/□, thus the effect against the ESD is further enhanced. The transparent conductive film 7 satisfying both the range of the film thickness and the relatively low resistance described above can be formed at the relatively low cost.

The liquid crystal display device 100 according to the embodiment 1 includes the opening portion in the light-shielding film 3 having substantially the same size as the display region 5a, and more properly, the opening portion 3a in the light-shielding film 3 is provided to be slightly larger than the opening portion in the black matrix which is the light-shielding film provided in a surrounding part of the display region 5a on the side of the liquid crystal panel 5 (the counter substrate 8) determining an outline of the display region 5a. The opening portion 3a is set in such a manner in many cases so that the size or the position of a boundary of the display region 5a does not fluctuate due to a misalignment caused by a relatively low accuracy in a position adjustment between the liquid crystal panel 5 and the transparent protective material 1 on which the light-shielding film 3 is provided. When a dummy pixel region with a constant black display is provided in the surrounding part of the display region 5a, a boundary of the opening portion 3a may be set within the dummy pixel region in some cases, however, the opening portion 3a is set larger than the display region 5a in any case. Furthermore, a region, in which the transparent conductive film 7 having the film thickness ranging from 120 nm to 160 nm is formed, covers the display region 5a and the entire outer surface of the counter substrate 8, that is to say, the region in the counter substrate 8 facing the light-shielding film 3.

When the liquid crystal display device 100 is in inactive state (or a black-display state) in the above structure, a mutual effect of the low reflection ratio of the liquid crystal display device 100 caused by the effect according to the basic configuration of the present invention causes a boundary between the light-shielding film 3 formed on the transparent protective member 1 and the surrounding part of the display region 5a in the liquid crystal panel 5 to be hardly seen. As a result, the configuration of the liquid crystal display device 100 according to the embodiment 1 can obtain the effect of improving the visibility of the boundary between the light-shielding film 3 formed on the transparent protective member 1 and the surrounding part of the display region 5a in the liquid crystal panel 5. Herein, the boundary between the light-shielding film 3 and the surrounding part of the display region 5a specifically indicates the boundary between a black state of the light-shielding film 3 and a black state of the pixel in a black display state or the black matrix in the liquid crystal panel 5 (the surrounding part of the display region 5a). The transparent conductive film 7 needs to be located in at least a boundary part between the light-shielding film 3 and the surrounding part of the display region 5a in the liquid crystal panel 5 in a planar view so as to obtain the above effect. That is to say, since the transparent conductive film 7 is formed in the region covering the display region 5a, it needs to extend at least from the periphery of the display region 5a to the boundary part of the opening portion 3a in the light-shielding film 3 in a planar view.

Embodiment 2

In the liquid crystal display device 100 according to the embodiment 1, the display on the liquid crystal panel 5 is colored in some cases when the transparent conductive film 7 is set to have a specific film thickness, which is relatively thick, ranging from 120 nm to 160 nm. For example, when the transparent conductive film 7 is set to have a film thickness which causes the display on the liquid crystal panel 5 to be colored to blue-green, specifically, a transmission rate or a reflection ratio relatively increases in a range of film thickness from 480 nm to 500 nm corresponding to a wavelength range of blue-green in a single body of the liquid crystal panel 5.

Accordingly, for example, the color caused by the transparent conductive film 7 can be offset and reduced by using a member whose transmission characteristics are adjusted as a constituent member other than the transparent conductive film 7. Specifically, when the display is colored to blue-green as the example described above, for example, it is applicable to combine the other constituent member whose light transmission rate in the wavelength range from 480 nm to 500 nm is relatively lower than a light transmission rate in the other wavelength range.

Although the configuration in the liquid crystal panel 5 or the configuration other than the liquid crystal panel 5 in the liquid crystal display device may be selected as the member for adjusting the transmission characteristics, it is preferable to select the transparent protective member 1 from the perspective that a material can be comparatively easily selected. In the liquid crystal display device according to the embodiment 2, applied as the transparent protective member 1 is a transparent protective member having the transmission characteristics to offset the transmission characteristics of the transparent conductive film 7 (for example, the transmission characteristics that the light transmission rate in the wavelength range from 480 nm to 500 nm is relatively lower than the light transmission rate in the other wavelength range so as to reduce the coloring of blue-green, as the above description). Since the configuration in the liquid crystal display device according to the embodiment 2 other than the transparent protective member 1 is similar to that of the liquid crystal display device 100 according to the embodiment 1, the detailed description is omitted.

In the configuration of the liquid crystal display device according to the embodiment 2 described above, the transparent protective member 1 having the transmission characteristics of offsetting the transmission characteristics of the transparent conductive film 7 is used, thus the coloring of the display can be improved in addition to the fact that the effect similar to the embodiment 1 can be obtained.

Various Modification Examples of the Embodiment 2

As a further modification example of the embodiment 2 described above, for example, transmission characteristics of the other member may be adjusted instead of the transparent protective member 1. Some modification examples of partially changing the configuration in the embodiment 2 are described hereinafter.

First Modification Example of the Embodiment 2

In the present modification example, a member whose transmission characteristics are adjusted is used as the transparent adhesive material 2 without adjusting the transmission characteristics of the transparent protective member 1 in the liquid crystal display device according to the embodiment 2.

In the present modification example, the transparent adhesive material 2 having the transmission characteristics of offsetting the transmission characteristics of the transparent conductive film 7 is used, thus the coloring of the display can be improved in the manner similar to the embodiment 2.

Second Modification Example of the Embodiment 2

In the present modification example, a substrate whose transmission characteristics are adjusted is used as the counter substrate 8 without adjusting the transmission characteristics of the transparent protective member 1 in the liquid crystal display device according to the embodiment 2. In the present modification example, a chromaticity of the color filter included in the counter substrate 8 is adjusted to adjust the transmission rate of the counter substrate 8. The chromaticity of the color filter may be adjusted by a ratio of the opening for each pixel of R (red), G (green), and B (blue) (that is to say, a ratio of an area of the opening portion of the black matrix to an area of the pixels), or it is also applicable to adjust transmission rate characteristics for each wavelength of each color material layer of RGB. A method of adjusting the transmission rate characteristics for each wavelength of each color material layer includes changing a thickness of the color material layer or changing a contained amount of colorant mixed to develop the color.

In the present modification example, the counter substrate 8 having the transmission characteristics of offsetting the transmission characteristics of the transparent conductive film 7 is used, thus the coloring of the display can be improved. Since the adjustment of the chromaticity of the color filter in the counter substrate 8 is one of the common practices performed in designing a general color specification, thus is preferable from the perspective that the transmission characteristics of the counter substrate 8 can be adjusted comparatively easily.

The embodiment 2 and each modification example thereof describe the case of improving the coloring of the display using one member having the transmission characteristics of offsetting the transmission characteristics of the transparent conductive film 7, however, the coloring of the display may also be improved using a plurality of members having transmission characteristics of offsetting the transmission characteristics of the transparent conductive film 7.

Embodiment 3

In the liquid crystal display device according to the embodiment 2 and the various modification examples, the coloring of the display caused by the transparent conductive film 7 is improved using the member having the transmission characteristics of offsetting the transmission characteristics of the transparent conductive film 7. In the meanwhile, in the liquid crystal display device according to the embodiment 3, the coloring of the display caused by the transparent conductive film 7 is improved by forming a trimmed pattern (or an opening pattern) provided in a row in at least the display region 5a having an influence on the coloring of the display in the transparent conductive film 7.

Figure 5:
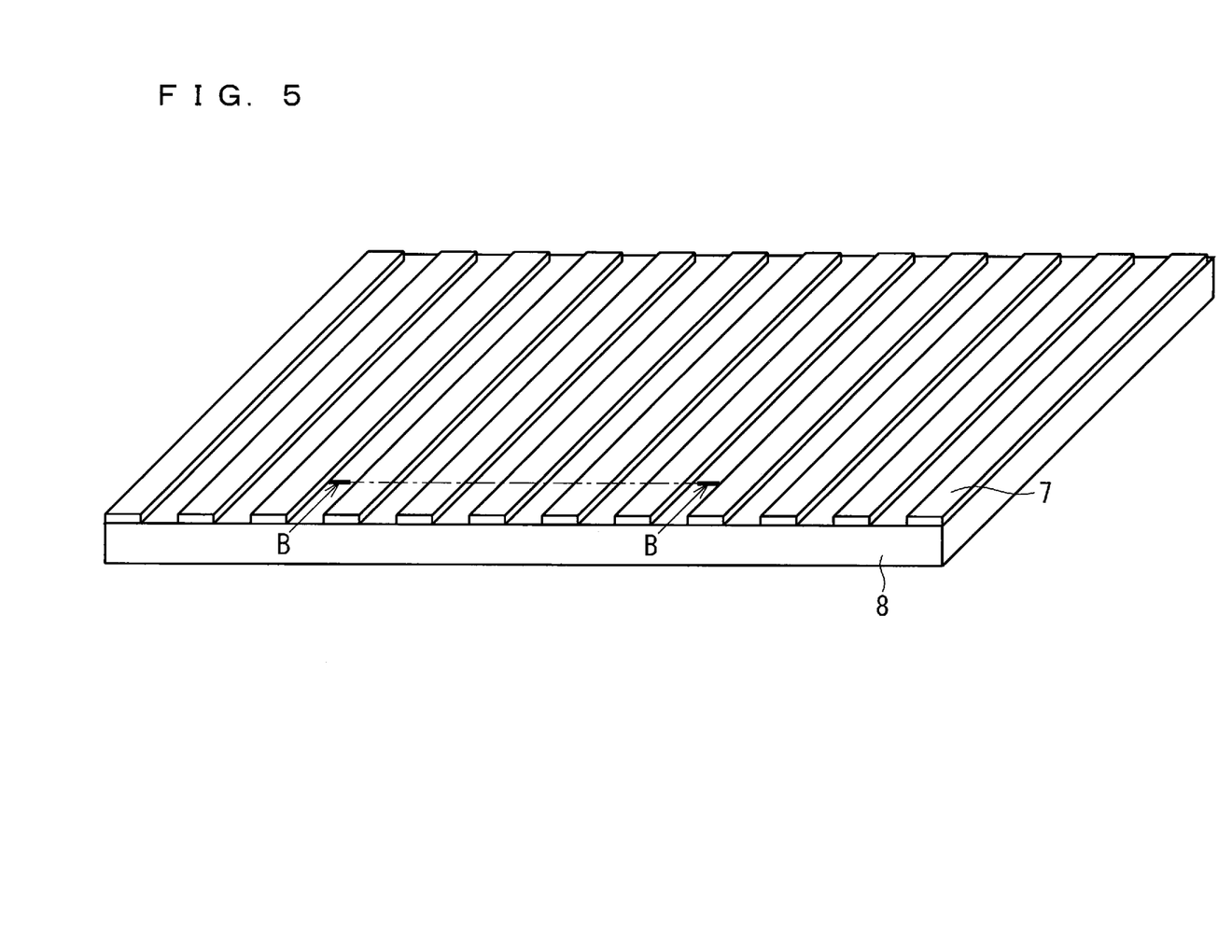
FIG. 5 is a perspective view of a counter substrate and a transparent conductive film according to an embodiment 3.
Figure 6:
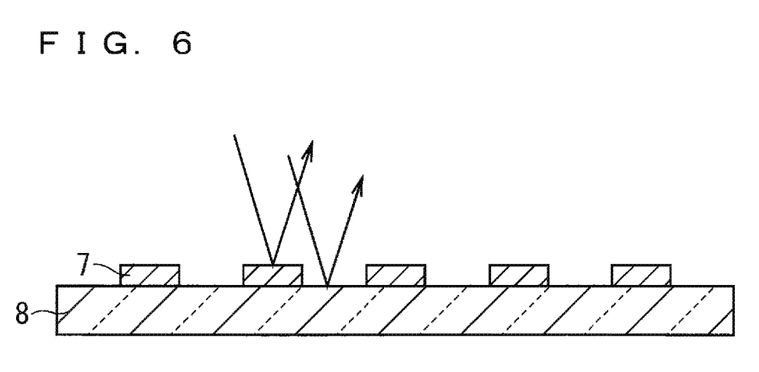
FIG. 6 is a cross sectional view of the counter substrate and the transparent conductive film according to the embodiment 3.

FIG. 5 is a perspective view schematically illustrating an example of the configuration of the counter substrate 8 and the transparent conductive film 7 in the liquid crystal display device according to the embodiment 3. FIG. 6 is a cross sectional view taken along an arrow B-B illustrated in FIG. 5. Arrows in FIG. 6 schematically illustrate a reflection of the external light by the transparent conductive film 7 and the counter substrate 8. Since the configuration in the liquid crystal display device according to the present embodiment other than the counter substrate 8 and the transparent conductive film 7 is similar to that of the liquid crystal display device 100 according to the embodiment 1, the detailed description is omitted.

As illustrated in FIGS. 5 and 6, the transparent conductive film 7 in the present embodiment has a linear trimmed pattern provided in a row (that is to say, a region from which the counter substrate 8 is exposed), and in contrast, a pattern formed by the remaining transparent conductive film 7 also has a linear pattern provided in a row. Each pattern of the transparent conductive film 7 having the linear shape may be connected by the transparent conductive film 7 in an outer side of the display region 5a and grounded and connected in the manner similar the transparent conductive film 7 of the embodiment 1. Alternatively, each linear pattern of the transparent conductive film 7 may also be used as a wire pattern. For example, when the counter substrate 8 is configured to have a function as a touch panel, the linear pattern of the transparent conductive film 7 may also be used for a sensor wire of the touch panel.

In the present embodiment, as illustrated in FIG. 6, the effect similar to the embodiment 1 can be obtained in the area where the transparent conductive film 7 is included, and the reflection component of the transparent conductive film 7 disappears in the area where the transparent conductive film 7 is not included, thus the reflection ratio as the whole liquid crystal display device can be suppressed. Moreover, since the transparent conductive film 7 is formed by patterning, an absolute amount of the transparent conductive film 7 is reduced, thus the coloring the display can be improved.

The trimmed pattern provided in a row in the transparent conductive film 7 in the present embodiment is not limited to the linear trimmed pattern, but a configuration of providing a rectangular opening pattern in a row or a configuration of providing a slit-like opening pattern in a row is also applicable, and the effect similar to the above description can be obtained as long as the display region 5a includes the part from which the counter substrate 8 is exposed.

Embodiment 4

In the liquid crystal display device according to the embodiment 3, the coloring of the display caused by the transparent conductive film 7 is improved by forming the trimmed pattern (or the opening pattern) provided in a row in at least the display region 5a having the influence on the coloring of the display in the transparent conductive film 7. In the meanwhile, in the liquid crystal display device according to the embodiment 4, the coloring of the display caused by using the transparent conductive film 7 is improved by causing the transparent conductive film 7 to have a comparatively thin film thickness within a range which is not applied in the embodiment 1.

Herein, reviewing particularly the graph of the calculation value of the film thickness dependency of the transparent conductive film with respect to the reflection ratio in the liquid crystal display device in FIG. 4 which is referenced in the embodiment 1, the reflection ratio can be significantly reduced when the transparent conductive film has the film thickness ranging from 0 nm to 25 nm and from 120 nm to 160 nm as described previously, however, it is shown that the reflection ratio can be reduced to some degree when the transparent conductive film has the film thickness ranging from 25 nm to 40 nm. In the meanwhile, also regarding the effect against the ESD, when the transparent conductive film has the film thickness ranging from 25 nm to 40 nm, the effect against the ESD can be expected to some degree compared with the case of having the film thickness ranging from 0 nm to 25 nm. Moreover, the problem regarding the coloring of the display which is the problem in the embodiment 2 and the subsequent embodiments does not arise in this comparatively thin film thickness range. Accordingly, in the liquid crystal display device according to the embodiment 4, the film thickness of the transparent conductive film 7 formed on the counter substrate 8 is set within the range from 25 nm to 40 nm. Moreover, the operation of reducing the reflection ratio in the present embodiment 4 achieved from the operation of the transparent conductive film 7 is smaller than that of the embodiment 1, thus the transparent protective member 1 at least whose surface is subject to the AR treatment is used. Since the configuration in the liquid crystal display device according to the embodiment 4 other than the transparent conductive film 7 and the transparent protective member 1 is similar to that of the liquid crystal display device 100 according to the embodiment 1, the detailed description is omitted.

As described above, in the liquid crystal display device including the transparent protective member 1 attached on the in-plane switching liquid crystal panel 5 via the transparent adhesive member 2 according to the embodiment 4, the film thickness of the transparent conductive film 7 formed on the counter substrate 8 is set within the range from 25 nm to 40 nm, thus the function of suppressing the reflection of the external light entering from the side of the display surface and suppressing the external electrical field entering from the side of the counter substrate can be achieved on some level, and the effect enabling the improvement of the coloring of the display can be obtained at the same time. The transparent protective member 1 whose surface is subject to the AR treatment, that is to say, the transparent protective member 1 including the thin film layer, which has the antireflection function, on the surface is used together, thus the function of suppressing the reflection can be complemented. Accordingly, the transparent protective member 1 having such a configuration is particularly effective in the present embodiment 4.

According to the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
    an in-plane switching liquid crystal panel including a TFT substrate, a counter substrate sandwiching a liquid crystal layer between said counter substrate and said TFT substrate, and a transparent conductive film being provided on a surface opposite to said liquid crystal layer of said counter substrate, a side of said transparent conductive film being a side of a display surface;
    a transparent protective member covering a surface on said side of said display surface of said liquid crystal panel; and
    a transparent adhesive material attaching said transparent protective member on said surface on said side of said display surface, wherein
    said transparent conductive film has a film thickness ranging from 120 nm to 160 nm.

2. The liquid crystal display device according to claim 1, wherein said transparent conductive film has a sheet resistance ranging from 10Ω/□ to 25 Ω/□.

3. The liquid crystal display device according to claim 1, further comprising
    a light-shielding film being disposed to have a frame shape with an opening portion along a periphery of a surface of said transparent protective member closer to said liquid crystal panel, wherein
    said transparent conductive film extends at least from a periphery of a display region in which a video is displayed on said liquid crystal panel to a boundary part of said opening portion in said light-shielding film in a planar view.

4. The liquid crystal display device according to claim 1, wherein
    a transmission rate of at least one of said transparent protective member, said transparent adhesive material, and a member constituting said liquid crystal panel has a wavelength dependency reducing a coloring of a display on said liquid crystal panel caused by a wavelength dependency of a transmission rate or a reflection ratio of said transparent conductive film.

5. The liquid crystal display device according to claim 4, wherein
    said counter substrate includes a color filter, and
    a transmission rate of said counter substrate has a wavelength dependency reducing said coloring determined by a chromaticity of said color filter.

6. The liquid crystal display device according to claim 1, wherein
    said transparent conductive film has a part from which said counter substrate is exposed in a display region in which a video is displayed on said liquid crystal panel.

7. The liquid crystal display device according to claim 1, wherein
    a thin film layer having an antireflection function is provided on a surface of said transparent protective member.

8. The liquid crystal display device according to claim 1, wherein
    said transparent conductive film is a sputtering film.

9. The liquid crystal display device according to claim 1, wherein
    said transparent conductive film is an ITO film.

\* \* \* \* \*